April 4, 1939.　　F. H. G. SVENSSON ET AL　　2,152,931
SAW SHARPENING APPARATUS
Filed Dec. 19, 1935

Inventor:
Frans Henry Gunnar Svensson
John Erik Wide Svensson

Patented Apr. 4, 1939

2,152,931

UNITED STATES PATENT OFFICE 2,152,931

SAW SHARPENING APPARATUS

Frans Henry Gunnar Svensson and John Erik Wide Svensson, Lillsjodal, Sweden

Application December 19, 1935, Serial No. 55,140
In Sweden February 5, 1935

4 Claims. (Cl. 76—31)

The present invention relates to a saw sharpening apparatus of that kind in which the file or the like, used for sharpening together with a guide for the forward and backward movement of the file is adjustable in a horizontal plane, in a vertical plane and also in both planes simultaneously, besides which the file or the like is mounted rotatable about its own longitudinal axis and an axis parallel therewith. By means of the invention not only a great simplification in the construction is obtained but also an improvement as regards accurate adjustment of the file-guide in relation to the saw-teeth to be sharpened.

The apparatus is primarily intended for circular saws of the kind wherein every tooth is sharpened by filing the front and back edges, which edges meet at the point of the tooth. As is well known these two edges are not only beveled, but the bevels of two adjacent teeth are oppositely directed. Therefore, on filing the edges of two adjacent teeth the file-guide of the apparatus must be accurately adjustable not only to the edge bevel of the first tooth but also after this tooth has been sharpened and must be adjustable to the differently directed bevel of the adjacent tooth, when the same is to be sharpened.

When using the apparatus hitherto known wherein the beveled front edge of one saw-tooth has been filed, and the differently beveled front edge of the adjacent tooth is to be filed, it has been necessary to release the file-guide from its adjustment after sharpening the first tooth and then to adjust the guide to the bevel of the second tooth. This readjusting is not only troublesome and wastes time but above all, even by using a gauge, the adjustment of the file guard to ensure that the beveled angles of all the teeth are equal, presents great difficulties.

These difficulties are entirely eliminated by the present invention, wherein the file-guard does not need to be released from its adjustment when moving from one tooth to another.

The apparatus according to the invention is characterized by the fact that the file guide whilst maintaining its adjusted position, corresponding to the beveling at the edges of the saw-teeth, may be moved from one tooth to another by swinging or turning in a plane parallel or approximately parallel with the saw-blade or in a plane perpendicular or approximately perpendicular thereto.

The accompanying drawing shows by way of example an embodiment of the invention with the file guide adjusted in different positions.

Figure 1:
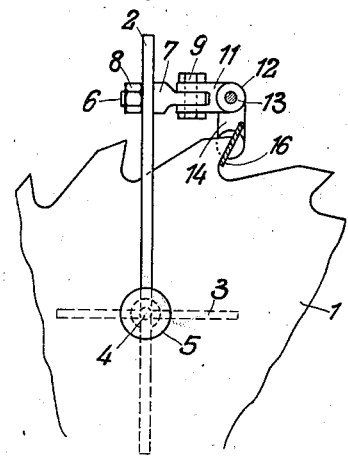
Figure 1 shows the apparatus seen perpendicularly to the saw-blade and adjusted for sharpening the beveled front-edge of a saw-tooth.
Figure 4:
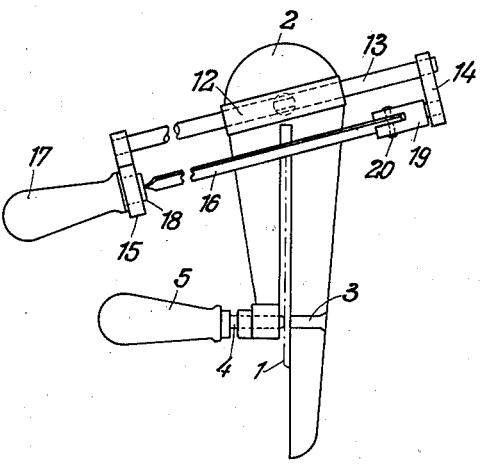
Figure 4 shows the apparatus seen in the longitudinal direction of the saw-blade and adjusted for sharpening the beveled back-edge of a saw-tooth.

According to the construction shown in the drawing the apparatus consists of a substantially bow-shaped holder 2, adapted to be slipped on to the saw blade 1 from the edge. The blade is illustrated in full lines in Figure 1 and in dotted lines in the other figures. A cross-shaped member 3, which is mounted on the one shank of the holder and pressed against the one side of the saw blade by a screw 4 in the other shank of the holder provided with a handle 5 and prevents the holder from moving relatively to the saw blade. The upper, bowed part of the holder is provided with an opening, through which a pin 6 of a member 7 extends to nut 8 on the screw pin secures the member to the holder in any desired position. The member 7 is hingedly connected with a forked member 11 by means of a bolt 9 so that by tightening this bolt the members 7 and 11 may be fixed at any desired angle. A guide sleeve 12 is rigidly connected with the member 11 and carries a bar 13 which can be moved forwardly and backwardly and turned in the sleeve. At the ends of the bar cross-pieces 14 and 15 are fixed, which crosspieces serve as bearings for the file 16. One end of the file engages a ring 18 on the file handle 17, and the other end engages in a socket 19, in which it is held by means of a pin 20. The crosspiece 14 is slidably mounted upon the bar 13 and provided with a set-screw 21, by means of which it can be fixed in different positions, to suit different file-lengths.

Figure 2:
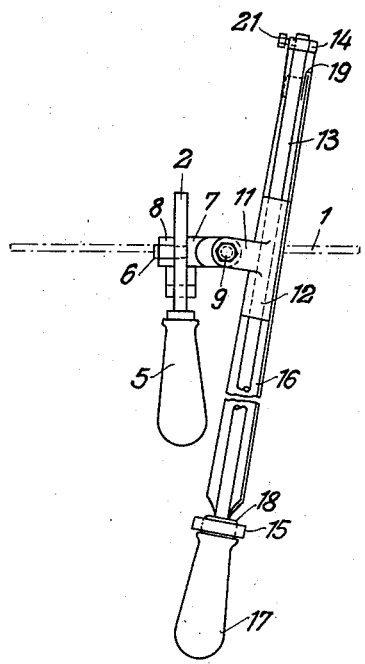
Figure 2 shows the apparatus in the adjustment according to Figure 1 seen from above.

According to the Figures 1 and 2 the file 16 is adjusted for sharpening the front edge of a saw-tooth. The joint 7 by tightening the nut 8 is fixed to the holder 2, and the joints 7 and 11 by fastening the bolt 9 are adjusted in relation to each other in a manner, which corresponds to the beveling of the tooth-edge. The file 16, which is turnably arranged in the cross-pieces 14 and 15, then may be brought to a position, in which it is correctly held against the front edge of the saw-tooth, as shown in Figure 1. During the sharpening of the saw the file is moved forwards and backwards, in the usual manner, being guided in its adjusted position by means of the bar 13, which slides forwardly and backwardly in the sleeve 12 connected by the members 7 and 11 to the holder 2, fixed to the saw-blade 1.

When the front edge of every second tooth has been filed in this manner, the front edges of the other teeth, which are beveled in another direction, must be filed in a corresponding manner, so that their bevel-angle corresponds to that of the teeth which have already been sharpened. This is attained by first unscrewing the nut 8, then withdrawing the pin from opening in the holder 2, and removing the file 16 with its guide 15, maintaining the adjustment between the members 7 and 11. The file together with the still adjusted guide is then swung upwards above the upper end of the holder, i. e., it is swung in a plane parallel or approximately parallel with the plane of the saw-blade, so that the file together with the guide will lie on the opposite side of the holder. The pin 6 is then inserted in the opening in the holder, and the nut 8 screwed tightly thereon, when the apparatus is brought into the position shown in Fig. 3 without altering the adjustment of the bevel.

Figure 3:
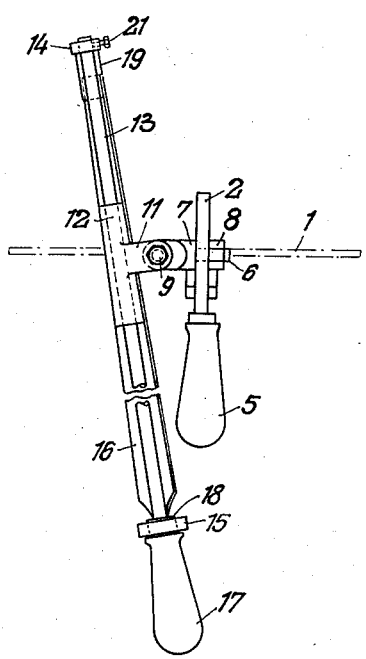
Figure 3 shows the apparatus in the adjustment according to Figure 1 seen from above and from the position shown there swung upwards and to the left 180°.

According to Figure 3 the file is adjusted for sharpening the back edge of a saw-tooth. The joints 7 and 11 are brought into alignment and the joint 7 upon the pin 6 is turned to and fixed in such a position, that the file is correctly held against the bevel of the back edge of the tooth. When every second tooth has been filed with the file in this position the holder 2 together with the file guide and the file is lifted from the saw-blade and swung so that the file-handle 17 and the handle 5 of the holder lie on the opposite side of the saw-blade, i. e., the apparatus in its entirety is swung in a plane, which is perpendicular or approximately perpendicular to the saw-blade without disturbing the adjustment corresponding to the edge beveling of the saw-tooth. In this position the other tooth-edges of the saw-blade, which are beveled in opposite direction may be filed.

It is of course possible to modify in various ways the apparatus above described as to the construction without departing from the ambit of the invention. Instead of arranging the file and its guide turnably around a horizontal and a vertical axis it is obvious that a universal-joint, a ball and socket joint, may be used, on which the file-guide is turnably mounted. For moving the file guide from one saw-tooth to an adjacent tooth, the upper part of the holder 2 together with the hold for the file-guide may for instance be arranged in such a manner, that it can be swung or turned in two planes, one of which forms a right angle with the plane of the saw-blade while the other is parallel thereto. With such an arrangement the above-mentioned loosening of the file-guide and also the lifting up and turning of the apparatus in relation to the saw-blade is eliminated.

In order to make it possible to control the adjustment of the file-guide the apparatus may be provided with an angle scale, which is arranged between the holder 2 and the parts adjustable in relation to the same.

We claim:

1. A sharpening apparatus for circular saws comprising, in combination, a clamping holder having a slot and adapted to be slipped over the saw blade, a bar member carried by one leg of said clamping holder for pressing against the saw blade, a screw bolt having a handle carried by the end of the other leg of said holder, and impinging on the saw blade to fix the holder in position, a pin passing through a hole in the holder, an abutment member carried by said pin, a forked member carrying a guide sleeve hingedly connected with said abutment member, the abutment member and the guide sleeve oscillating in planes at right angles for adjustment and means for fixing said members in adjusted positions.

2. In a sharpening apparatus for circular saws as claimed in claim 1 the means for adjustably fixing the forked member carrying the guide sleeve on the clamping holder comprising a screw pin passing through a hole in the clamping holder, an abutment carried by the other end of said pin, a perforated tongue carried by said abutment member, a nut on the screw pin for clamping the abutment member and tongue in position on the holder, a forked member embracing said tongue and carrying the guide sleeve, a bolt passing through the fork and tongue and a nut on said bolt for fixing the abutment member and guide sleeve in adjusted position.

3. In a sharpening apparatus for circular saws as claimed in claim 1 the means for adjustably fixing the forked member carrying the guide sleeve on the clamping holder comprising a screw pin projecting through a hole in the holder, an abutment having a tongue at the other end of said pin, a nut on the screw pin for clamping the abutment member in position on the holder, a perforated lug carried by said abutment member, a forked member embracing said lug, the guide sleeve being carried by said forked member, a bolt passing through the fork and lug, and a nut screwing on said bolt for fixing the guide sleeve in adjusted position, said screw pin being inserted alternately from either side of the holder to file the saw teeth at the same angle on either side of the saw blade.

4. In sharpening apparatus for circular saws as claimed in claim 1 including file holders for carrying the file, a slot at one end of one of said file holders to receive the flat end of a file, a rivet passing through the slot to fix the file therein, a pivot pin in the other end of said file holder, arms carrying said file holders, means carrying said arms, said pivot pin engaging in a hole in one arm, the other file holder having a socket for receiving the other end of the file, said latter file holder being rotatable in the other arm, and a handle for reciprocating the file during the filing operation.

JOHN ERIK WIDE SVENSSON.
FRANS HENRY GUNNAR SVENSSON.